Oct. 25, 1960    C. W. CHILLSON ET AL    2,957,687
GOVERNOR AND SPEED CONTROL FOR HELICOPTERS AND THE LIKE
Filed April 10, 1956    5 Sheets-Sheet 1

INVENTORS
CHARLES W. CHILLSON
EDWARD K. HINE
BY
ATTORNEY

Oct. 25, 1960 C. W. CHILLSON ET AL 2,957,687
GOVERNOR AND SPEED CONTROL FOR HELICOPTERS AND THE LIKE
Filed April 10, 1956 5 Sheets-Sheet 4

Fig. 6

INVENTORS
CHARLES W. CHILLSON
EDWARD K. HINE
BY
ATTORNEY

United States Patent Office 2,957,687
Patented Oct. 25, 1960

2,957,687

GOVERNOR AND SPEED CONTROL FOR HELICOPTERS AND THE LIKE

Charles W. Chillson, Packanack Lake, and Edward K. Hine, North Caldwell, N.J., assignors to Curtiss-Wright Corporation, a corporation of Delaware Filed Apr. 10, 1956, Ser. No. 577,229

16 Claims. (Cl. 137—18)

This invention relates to speed control arrangements for rotary wing systems, as on helicopters, and more particularly includes a rotor speed responsive governor, acting on the rotor prime mover, along with manual control and adjusting instrumentalities.

The governor of the invention may have other uses than on helicopters, as will become apparent.

A conventional helicopter rotor control system includes a member to adjust collective pitch of the rotor blades, along with a grip on the member movable to adjust the throttle. Collective pitch adjustment is a primary control for the air vehicle to regulate its lift; adjustment of the engine throttle is a concurrent primary control to maintain rotor speed at a desired level during changes in load on the rotor resulting from lift changes. It is desirable, to simplify the pilot's activities, to enable rotor speed to be governed at times, avoiding the need for concurrent manual collective pitch and throttle adjustment. Yet changes in rotor speed must always be within the pilot's immediate command to enable him to change governor setting or to enable manual throttle control.

Other desirable features in a rotor speed governor system include arrangements to prevent rotor overspeed, to provide accurate and fast throttle response by incorporating derivative stabilization in the governor action, to provide for governor speed adjustment concurrently with, and following rotor speed adjustment when the governor is disconnected from throttle control, to provide throttle grip follow-up of governor action when the rotor is under governor control; to provide for closed engine throttle for shut down when the control is connected to the governor, and to provide means for the governor to act automatically as a speed limiter when the system is set for manual control.

Objects of the invention are to provide a governor and control system to meet the foregoing, and other, desirable features, and to provide a compact, all-mechanical apparatus which is positive and independent of secondary power supplies or sources. Other objects of the invention will appear as a more detailed description of the invention proceeds.

Principal features of the invention are shown in the annexed drawings, in which similar reference characters designate similar parts, and in which.

Figure 1:
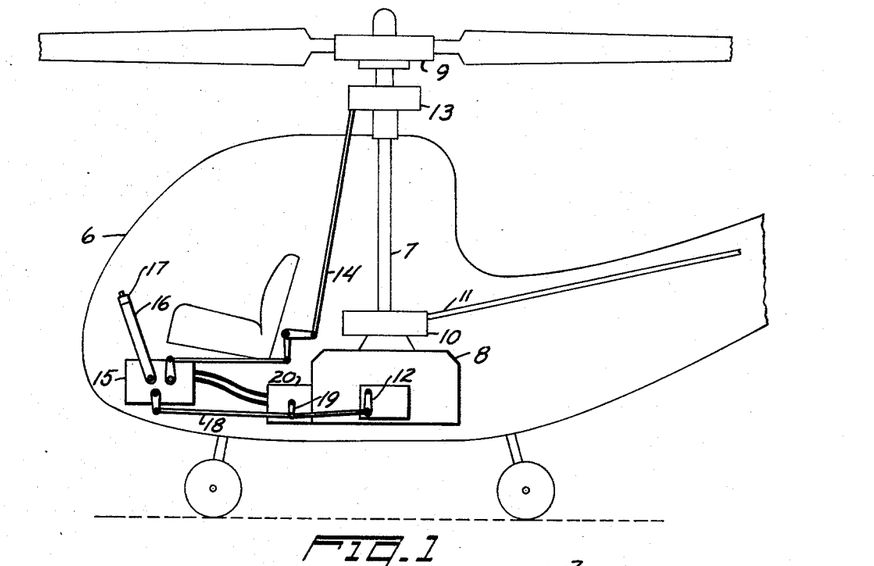
Fig. 1 is a generalized side elevation of a helicopter showing the usual arrangement of certain principal components, along with a practicable location for a rotor governor.

For general orientation, reference may be made to Fig. 1 wherein a helicopter fuselage is indicated by the outline 6. A vertical shaft 7 is driven by a prime mover or engine 8 of any desired type, the shaft driving the rotor or rotary wing system 9. A power take-off 10 may drive a shaft 11 leading to a tail rotor, used for directional control as is well known. A prime mover or engine speed and power controller is indicated at 12, which may comprise part of the fuel control system to the prime mover.

The rotor 9, while having other controls, not shown, such as cyclic pitch control, includes a collective pitch adjuster known in the art and indicated by the rectangle 13. Collective pitch is adjusted by a control rod 14, linked to a control assembly 15, and operated by a pilot-manipulated collective pitch lever 16. The lever carries a rotatable throttle grip 17, drivably connected through suitable mechanism, not shown, to a control rod 18 connected to the controller or throttle 12. This rod is also connected to actuate, or be actuated by, an output arm 19 of a governor assembly 20. The description will now be directed to parts of the governor of the invention, and to command systems with which it may be used. First, reference may be made briefly to Fig. 3, to point out the principal component mechanisms.

Figure 3:
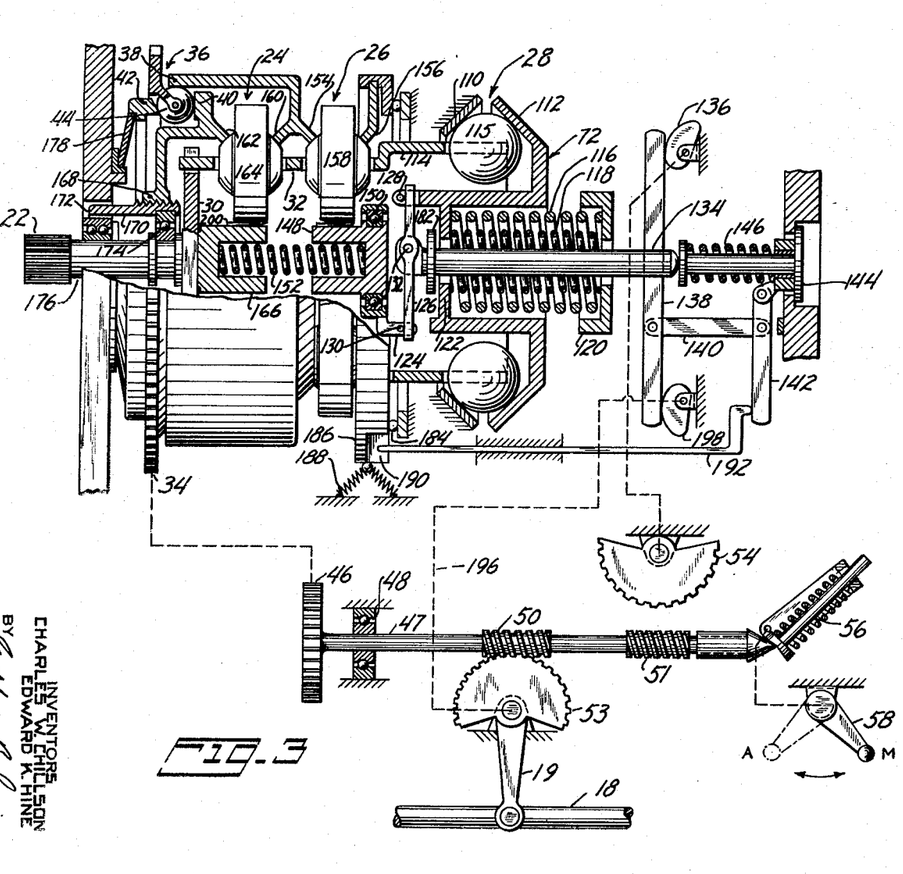
Fig. 3 is a schematic longitudinal section of a governor according to the invention.

The governor includes input shaft 22 driven by the prime mover at fixed speed ratio. This drives an integral speed changer 26 and a proportional speed changer 24 and a ball speeder section 28 through a plate 30 and a drive cage 32. Action of the governor rotates an output gear 34 through a ball differential 36 comprising two driven rings 38 and 40, a reaction ring 42, and a ball cage 44, the latter being secure on the gear 34. The output gear 34 drives a pinion 46 secured on a shaft 47 which is angularly rockable through a small angle in a bearing 48. This shaft carries two worms 50 and 51, the former being engageable with a wheel 53, and the latter with a wheel 54. By shifting the shaft 47 by an over-center toggle mechanism 56, operated by a manual control 58, worm 50 is engaged with wheel 53, or worm 51 is engaged with wheel 54. The former is the "automatic," or governor control connection wherein the governor output shaft 47 drives the throttle of the engine through rod 18 to maintain the engine speed to that for which the governor is set. The latter is the "manual" control connection wherein the throttle rod is actuated manually while the governor speed setting may follow the actual speed of the engine. The wheel 54 adjusts the governor speeder setting and, as will be seen, an additional manual setter may be used in conjunction with, or may supplant, the setting wheel 54.

Figure 2:
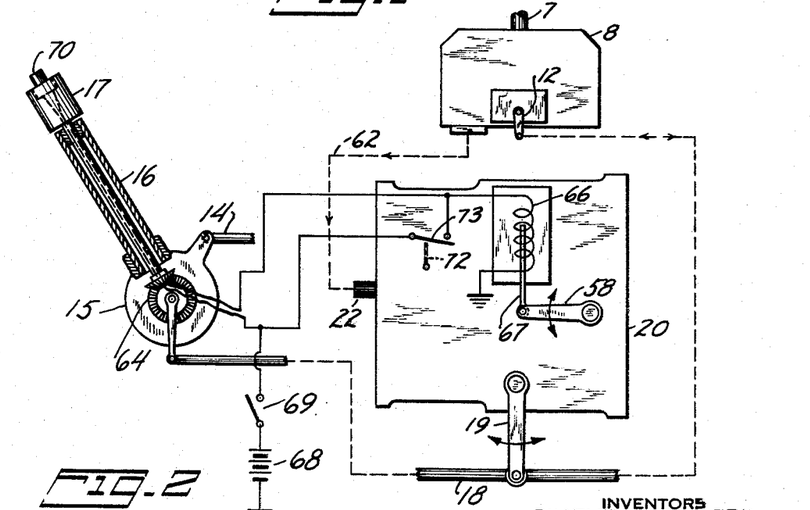
Fig. 2 is a schematic diagram of one command arrangement for a helicopter governor and throttle.

Now reference may be had to Fig. 2 which shows a presently preferred command arrangement for the governor. The govenor 20 is driven by a powerplant 8 through a mechanical drive connection 62; the twist grip 17 of the lever 16 is connected by gearing 64 through the rod 18 to the governor output lever 19 and the engine throttle 12. The governor is provided with a solenoid 66 acting on an armature 67 linked to the governor manual-automatic selector 58. A circuit for solenoid 66 includes a power source 68, a master switch 69, and a button switch 70 mounted atop the throttle grip 17. This button switch may be one which is normally up to close the circuit of solenoid 66, and which is pushed to open the circuit. The circuit is arranged preferably for closure to move lever 58 to the "automatic" setting, and for opening to move lever 58 to "manual." This renders the arrangement fail-safe in case of electrical failure as will be described. A button latch or hold-down may be provided to retain the system in "manual" control condition.

When the circuit is closed, the governor is connected to operate the engine throttle; the grip 17 follows governor-energized throttle adjustment whereby the pilot may at all times sense throttle action. When the circuit is open, governor control of the throtttle is disconnected and the throttle is manipulated directly by the grip 17. During manual throttle operation, the governor lever 19 is moved to reset the governor speed setting to the engine speed resulting from the then current throttle setting. Thus, when shifting between manual and automatic, there is no sudden call for a drastic speed change. For instance, suppose the system is on "automatic" and a change is desired from speed A to speed B. The pilot shifts from "automatic" on speed A to "manual" and adjusts the throttle grip 17 to attain speed B. During the manual speed transition, the governor desired speed setting follows the actual speed so that when the shift is again made from manual to automatic, the new automatic operation will be at speed B.

In the governor, an element 72 (Fig. 2) is provided which moves in accord with instant engine speed. This, when some desired maximum speed may be reached, closes a switch 73 in parallel with switch 70, shifting the governor to "automatic" operation if it had been on "manual." The governor takes command of the throttle to prevent further speed increase, thus acting as a speed limiter. Should it be necessary for the pilot to retain manual command of the system, regardless of overspeed, he can open the master switch 69, which prevents shift of the governor to, or retention in, the "automatic" position.

Figure 4:
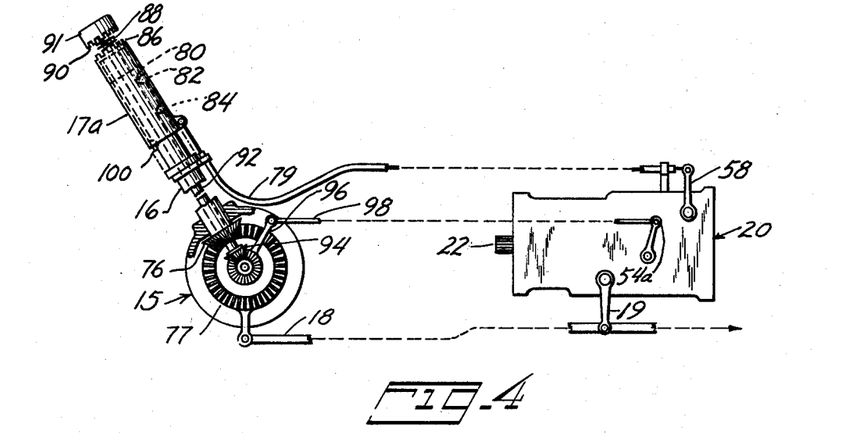
Figs. 4 and 5 are schematic diagrams of alternative helicopter governor and throttle command arrangements.

Fig. 4 shows an alternative command arrangement wherein the governor 20 is provided with an independent governor speed setting control 54a, corresponding to the worm wheel 54 in Fig. 3 by which governor speed setting is adjusted. In Fig. 4, the collective pitch control lever 16 is provided with a rotatable and slidable throttle grip 17a, slidable on and rotatable with and with respect to the tubular, rotatable lever 16. The lever 16, as previously covered, is swingable about a pivot and controls collective pitch. It is also rotatable about its own axis, carrying a bevel pinion 76 engaged with a bevel gear 77, the latter operating the throttle control rod 18. Axial movement of the grip 17a on lever 16 operates a push-pull assembly 79 of any suitable type, which connects to the manual-automatic shift lever 58 on the governor 20. The arrangement is such that downward movement of the grip 17a shifts lever 58 to "manual" and upward movement to "automatic." The grip is shown in its normal upward position whereat it is held by a detent 80 on the lever 16, engaging an opening 82 in the grip. In its downward position the grip 17a is held by a detent 84 which engages the grip opening 82. The grip 17a is provided with teeth 86 at its upper end, and is movable upwardly against a spring 88, beyond the said normal upward position. When so moved, teeth 86 engage teeth 90 of a rotatable cap 91 secured to a rod 92 passing through the lever 16, to a bevel pinion 94 adjacent the lever swing pivot. Pinion 94 engages a bevel gear 95, coaxial with gear 97, which has a lever 96 connected to a push-pull connection 98, connected to and actuating the governor speed setting lever 54a.

Grip 17a is keyed to lever 16 at 100 and rotates with it at all times except when the grip is raised against spring 88 to adjust governor setting. When so raised, the grip disengages the key 100, but re-engages it as soon as the governor setting adjustment is complete. Under both manual and automatic operating conditions the grip rotates with lever 16; in "automatic," the grip follows the governor, while in "manual," the grip controls throttle setting. The arrangement described provides a complete one-hand control for collective pitch, throttle actuation, governor selection and governor setting.

In an arrangement of this sort, the worm connection 51—54 of Fig. 3 is omitted since the governor setting is controlled separately by the lever 54a, instead of by coupling at times to the governor output.

Figure 5:
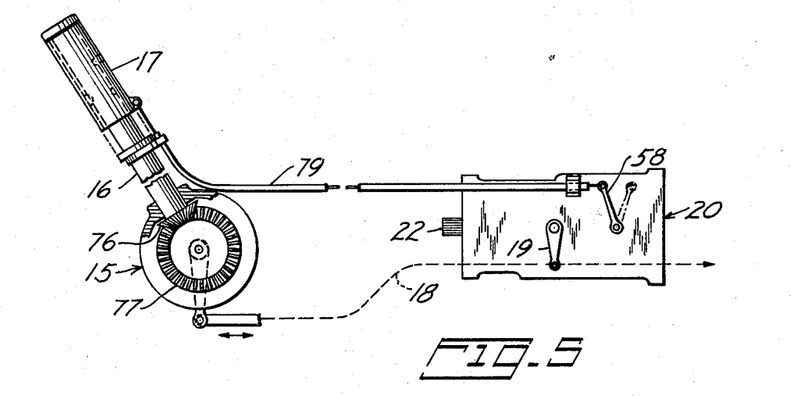

Fig. 5 shows another command system which is, in effect, an all-mechanical arrangement functionally like the command arrangement of Fig. 2. Herein, the grip 17 rotates the gears 76 and 77 and either drives (in manual control) or is driven by (in automatic control) the control rod 18 leading to the governor and engine throttle. As in Fig. 4, sliding of the grip in or out along the collective pitch lever moves the governor selector to "manual" or "automatic" respectively through a conection such as the push-pull cable 79. When the grip 17 is in the "manual" position, governor setting follows the speed of the engine through the governor mechanism shown in Fig. 3, as well as the grip 17 controlling the engine throttle directly through the connection 19. When the grip 17 is shifted to "automatic," the governor controls the engine throttle, to hold the speed at which the engine was operating at the time the shift from manual to automatic was made. When operating on "automatic," governor action is transmitted to the grip 17 for "feel" by the pilot.

There are many possible variations and modifications for the command system, and the three shown in Figs. 2, 4 and 5 are chosen as non-limiting, practical and desirable examples.

Reference should be had again to Fig. 3. The description of the governor shown therein, already given, referred only to components having direct connection with the control and command system. Following is a more detailed description. The speeder section 28 of the governor comprises a non-rotating conical race 110, and an opposed, axially movable non-rotating conical race 112, forming part of the member 72. Between these races a plurality of balls 115 are disposed, these being spaced circumferentially by a driving retainer 114 connected with the driving sleeve 32 and driven by the input shaft 22 through the drive plate 30. As the balls are spun about the governor axis by rotation of shaft 30, they exert centrifugal force against the races 110 and 112, tending to spread them apart; specifically, tending to move the race 112 rightwardly as shown. This movement is resisted by the speeder springs 116 and 118, which are held at their right ends by a fixed cup 120, and which bear at their left ends on a cup 122 integral with the member 72 carrying the race 112. The balls 115 rotate against the races 110 and 112 and assume a circular orbit whose radius is a function of the rotational speed of the shaft 22. Also, the race 112 and cup 122 assume an axial position which is a function of rotational speed. Thus, for any specific speed of the speeder system there is a corresponding axial position of the cup 122.

When a certain set speed is desired, the position of the cup 122 is established relative to a speeder output member 124 with the latter in a neutral position. This position is attained through a differential lever 126, the upper end of which is engaged under normal conditions by a pin 128 on the member 72. The lower end of the lever normally engages a pin 130 on the output member 124, and the lever is pivoted intermediate its length, at 132, on a speed setting member 134.

The latter is axially adjustable by a speed setting cam 136, adjusted by the speed setting wheel 54, through a lever 138, a link 140 and a lever 142. This is pivoted to a bushing 144 and engages a pushrod 146 in turn engaging the speed setting member 134. The cam 136 and associated elements are held from free rotation when the worm 51 and wheel 54 are disengaged by a light drag brake, not shown.

The speeder section output member 124 is secured for axial movement with and for rotation relative to an adjuster 148 through a thrust bearing 150, the adjuster 148 being urged rightwardly by a spring 152. By this spring, the adjuster pin 130 is held against the lever 126, and the lever is held against the pin 128 so that the adjuster is caused to follow axial excursions of the cup 122 for any fixed setting of the pivot 132.

The adjuster 148 comprises the shifter for the integral ball speed changer 26 through a leaf spring 200. The speed changer is driven by the sleeve 32 and operative to rotate its output race in one direction or the other relative to a fixed race 156 according to the tilt of the ball unit 158. This ball speed changer is of the type shown and claimed in our co-pending patent application Serial Number 465,500, filed October 29, 1954, now Patent No. 2,860,530. The speed changer output race 154 moves according to the integrated speed error of the governor shaft 22 relative to the set speed datum established by the position of the speed setting member 134. The output race 154 of speed changer 26 is integral with two other races; namely, an input race 160 to the second speed changer 24, and the input race 38 to the output differential 36 of the governor assembly.

The second speed changer 24, similar in general to 26, includes an output race 162, ball assemblies 164, and a ratio adjuster 166. The output race 162 is integral with the input race 40 of ball differential 36, and also is integral with a nut 168. This nut engages a non-rotating axially shiftable screw 170, held from rotation by a tang 172 engaging the governor housing. The screw 170 carries a thrust bearing 174 engaging a shaft 176 which joins the shaft 22 to the plate 30 and ratio adjuster 166, these rotating elements being axially shiftable with the nut 170 through the bearing 174. Axial shifting of the adjuster 166 regulates the drive ratio of the speed changer 24 in transmitting movement from race 160 and race 162. The speed changer 24 operates to mathematically differentiate, or calculate the first derivative of the integrated speed error represented by rotation of the race 154. Thus, the position of the races 162 and 40 is proportional to the speed error. The screw connection 168—170 operates to adjust the ratio of the speed changer 24, and to restore the changer to 1:1 ratio upon eradication of speed error.

The differential 36 sums the integral and proportional speed error outputs of the two speed changers and its output gear 34 moves according to the summed quantities. Thus, the position and movement of the gear 34 represents a derivative stabilized signal, applied to the gear 46 and related mechanism. This gear 46 calls for (1) throttle adjustment to restore engine speed to normal if the selector 58 is set for automatic control or (2) governor speed setting adjustment to correspond to the existing speed of governor input 22 if the selector 58 is set for manual control.

In addition to the governor structure described, several additional features are incorporated.

The spring 152, acting between speed changer adjusters 148 and 166, tends to urge both of them toward ratio positions which are opposite to those which are urged by operation of controlling instrumentalities.

The required frictional engagement of the speed changer races and their balls, and of the components of the ball differential 36, is all secured through the force exerted by a single loading spring 178 acting between the governor housing and the sloped-face reaction race 42 of the differential 36.

The governor incorporates additional automatic control provisions, to provide overspeed protection to close the throttle of the engine at a pre-selected low speed when the engine is shut down, and to provide compensations in the speed setting of the governor due to load conditions. These will be described in the order above set forth.

As formerly described briefly, should the engine and governor tend to increase in speed when the command system is set for manual control (see Fig. 3), the speeder section member 72 will move to the right. The position of this member, as implied before, is a direct function of speed. In Fig. 2, the element 72 which corresponds to the member 72 of Fig. 3, is operative, at a certain speed, to close the switch 73 energizing the solenoid 66 and placing the system on automatic control instead of manual control.

Thereupon, depending on the adjustment of switch 73 as to the speed of the governor at which it closes, the governor will control the engine throttle to prevent further speed increase. Should the pilot deliberately choose an overspeed operating condition, he may open the master switch 69 to prevent automatic system operation.

In a helicopter or other governed system, it is generally desirable to close the engine throttle when the engine is shut down to enable restarting of the engine with closed or substantially closed throttle. In effect, this imposes a need for automatic throttle closing when the engine speed drops below a certain level, say ¾ of normal engine idling speed. Shutting off of the engine is normally accomplished by leaning the fuel-air mixture to the engine or by cutting ignition or both.

In the governor described herein, a decrease in speed normally results in moving member 72 to the left which creates a call for open throttle, to provide more power to bring the speed up to the set value. Upon engine shut down, this is opposite to the effect desired. To close the throttle on shut down, when the member 72 moves leftwardly in response to low speed, the portion 122 of this member moves leftwardly and engages an abutment 182 secured on the stem 134, forcing the pivot 132 leftwardly. The lever is thus moved bodily to the left, stroking the speed changer adjuster 124 leftwardly and operating the speed changers to drive the output gears 34 and 46 to a throttle closing position, through elements 47, 53, 19 and 18.

When a throttle load change occurs, the load change is reflected into the speed changers and creep may occur therein which, if not compensated, introduces throttle setting errors. Means are provided, proportional to the torque load on the speed changers, to compensate this creep which has the effect of removing regulation errors due to speed changer operation. Mechanism for this purpose includes an oscillatory mounting 184 for the non-rotating speed changer race 156 and its carrier 186, the race and carrier being urged to a certain position by tangentially acting springs 188. The carrier 186 includes a sloped cam 190 which is engaged by a push rod 192 in contact with the link 142 of the adjusting mechanism. Upon torque reaction displacement of the carrier 186, the elements 192 and 142 adjust the ratio adjuster 124, 148 an incremental amount to compensate speed changer creep, at least in part.

The governor shown herein is isochronous, which under most conditions is a most desirable characteristic, since a desired speed is maintained regardless of throttle setting or driven load. Under some conditions of operation, droop in the system is desirable and means are provided to incorporate droop to any degree desired. To this end, the wheel 53, whose rotational position is directly related to throttle position through the connections 18 and 19, is drivably connected at 196 to a cam 198 engaging the link 136 of the speeder adjusting mechanism. The cam is formed to increase or decrease the governor speed setting according to throttle position, to insert droop to any desired degree.

In a system wherein two governed prime movers are driving a single load, a small amount of droop is needed in the governors so that the two prime movers can each drive their share of the load at desired speed. When the governor of the invention is used in such an environment, the cam 198 would be shaped to provide this.

In a helicopter, a different governor sensitivity is required in the low engine power range when the engine is decoupled from the rotor, from the higher power range when the engine and rotor are coupled. The cam 198 furnished a means for providing an effective difference in governor sensitivity between the high power and the low power range. At throttle settings corresponding to the rotor driving range, the cam 198 may be shaped to yield no speed setting change or droop.

Figure 6:
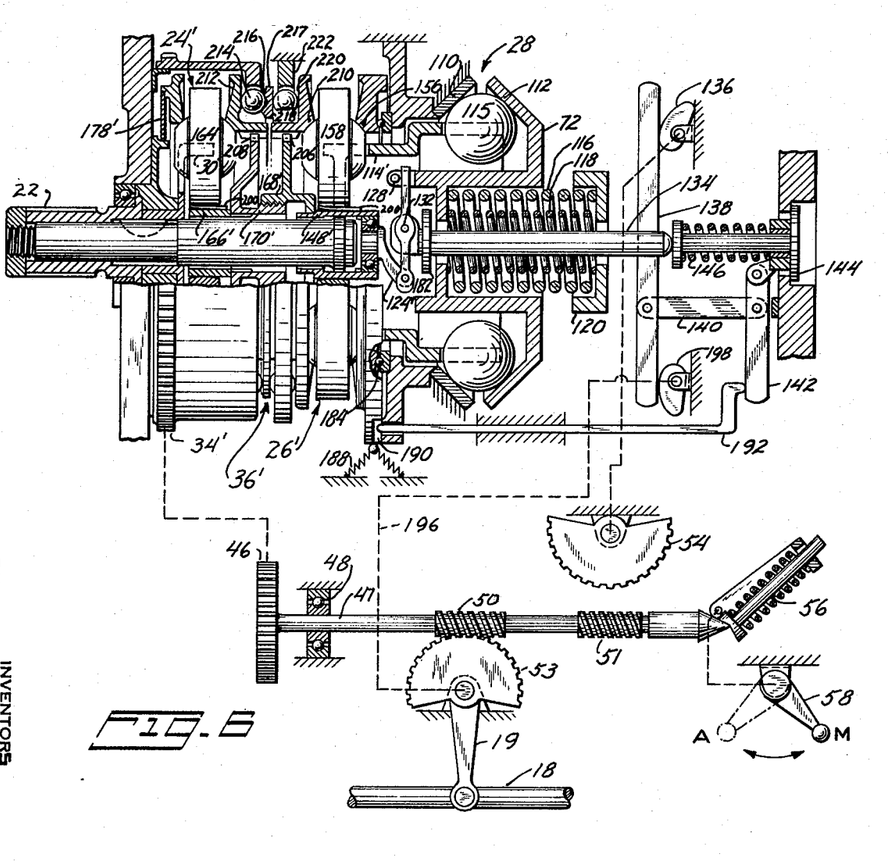
Fig. 6 is a schematic longitudinal section of an alternative governor arrangement.

Fig. 6 is a modification of the governor of Fig. 3, incorporating most of the components and functions thereof. Reference characters in Fig. 6 are the same as those in Fig. 3 where their components and functions are the same or are primed where functions are similar. Differences lie in the arrangements of the ball speed changers and ball differential. In Fig. 6, the ball speed changers 24' and 26' are, in a sense, arranged in parallel, while the changers 24 and 26 of Fig. 3 are, in a sense, in series. By the Fig. 6 arrangement, the torque output of the system is substantially greater, with consequent more powerful control of the governor driven load; namely, the engine throttle. The end effect of the Fig. 3 and Fig. 6 arrangements is for all practical purposes identical, although the mathematics of arriving at this same end effect differs between the two arrangements.

In Fig. 6 the adjuster 148' for the speed changer 26' is operated in an axial direction by the bracket 124', the joint between the adjuster and the race of the ball assembly 158 comprising a leaf spring 200 pre-set to urge the adjuster rightwardly and the ball assembly 158 counterclockwise. The adjuster 148' has thrust engagement at its left end with the nut member 168' which threadedly engages the screw member 170'. The latter bears at its leftward end, in thrust transmitting engagement, with the adjuster 166' of the speed changer 24'. The ball assembly 164 is connected to adjuster 166' by a leaf spring like 200. The nut and screw members 168' and 170' are respectively spline-connected at 206 and 208 to the output races 210 and 212 respectively. When a speed error signal is imposed on the speed changer adjuster 148', the same signal is passed through the nut and screw 168', 170' to the adjuster 166' of changer 24'. This will produce opposite rotation of output races 210 and 212, operating the screw connection 168', 170' to shift the changer 24' and steadying the output race 212 at a position corresponding to the proportional speed error. Meanwhile, the integral of the speed error appears in rotation of the output race 210 of speed changer 26'.

The two signals from output races 210 and 212 are summed in a ball differential 36' comprising balls 214 driving a retainer forming part of output gear 34'. The balls 214 are driven, on the left as shown, by a flat race face forming part of output race 212. On the right as shown, they are driven by a V grooved race 216 formed on one side of a ring 217, the right side of which is flat as at 218. The grooved race 216 opposing the flat race of element 212 provides a fixed ratio drive to the output gear 34'. The output race 210 of speed changer 26' carries a flat race face 220 opposing the face 218, between which another set of balls are disposed, the balls being retained in a non-rotating retainer 222. These latter balls enable reversal of the rotation of ring 217 from that of race 220, whereby the differential 36' is made to sum the outputs of the two speed changers.

Figure 7:
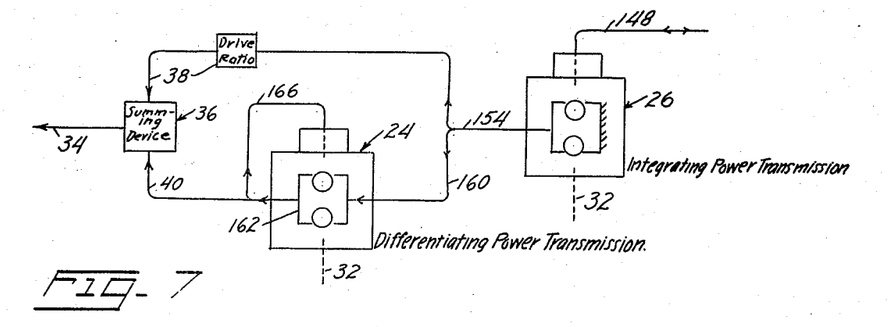
Figs. 7 and 8 are diagrams of part of the systems of Figs. 3 and 6 respectively.
Figure 8:
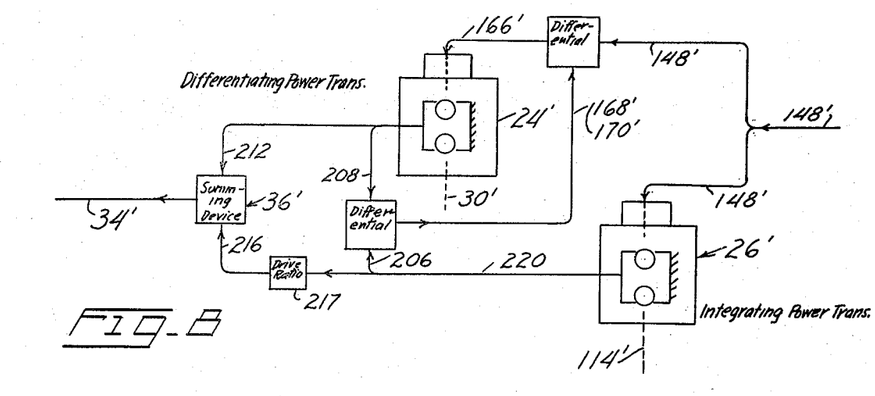

Figs. 7 and 8 are simplified diagrams of the assemblies of Figs. 3 and 6 respectively, less the speeder sections. These diagrams should be helpful in better understanding the functioning of the speed changers and other mechanisms shown in Figs. 3 and 6. Reference characters are the same as in Figs. 3 and 6. In both cases, the input to the integrating power-amplifying speed changers 26 and 26' is the low-powered instant speed error of the system, noted as ΔN, established according to the position of the element 148 or 148'.

In Fig. 7, the output of speed changer 26 is a power-amplified and mathematically integrated function of the instant speed error, noted as $$\frac{\Delta N}{S}$$

wherein S is the differential operator $$\frac{d}{dt}$$

This output is carried directly to one input 38 of the summing differential 36. Another branch of the output from speed changer 26 is carried to the input race of speed changer 24. This value is mathematically differentiated by the action of the speed changer which inserts a small time constant. The output race 162 thereof strokes the ratio adjuster through connection 166, whereby the output of speed changer 24 becomes a function of ΔN again but boosted in power. The output of speed changer 24 is carried to the summing differential 36 through race 40. Since the differentiating speed changer inserts a small time lag in the system, the output signal from the summing device 36, at the output element 34, is represented by the expression $$\frac{a\Delta N}{\gamma S+1}+\frac{b\Delta N}{S}$$

wherein $\gamma$ is the time constant of the differentiator.

In Fig. 8, the N input afforded by element 148' controls the ratio of the power amplifying integrating speed changer 26' so that its output at 220 is in terms of $$\frac{\Delta N}{S}$$

This is carried through a fixed ratio device 217 forming part of the summing device 36' which inserts the constant b in the integrated term $$\frac{b\Delta N}{S}$$

The elements 208 and 206 comprise a differential of two inputs driven respectively by the output elements of the speed changers 24' and 26', the output thereof comprising the relative rotative and axial position of the screw elements 168' and 170'. This screw connection is bodily shiftable by the system input 148' and thereby becomes in effect another differential whose output strokes the ratio changing control 166' of speed changer 24'.

The power amplified output 212 of speed changer 24' comprises the term ΔN, which is carried to the summing device 36'. The positions of elements 212 and 217 are combined in device 36' so that the position of its output 34' is according to the term $$\frac{a\Delta N}{\gamma S+1}+\frac{b\Delta N}{S}$$

which is the same as the output term for the Fig. 7 arrangement.

An advantage of the Fig. 8 arrangement over that of Fig. 7 is that it provides a more powerful output force in a mechanism of given size.

As stated before, the arrangements of Figs. 3 and 6 yield the same effective result, and either may be used in the several alternative command systems shown in other figures and previously described.

The governors as shown and described may be used with other command systems, and for control of other than helicopter systems. Also, the command systems disclosed may be used with other sorts of governors having analogous functional attributes.

The governors as described may be used in any system where a low-energy instant speed error signal is available. The governors' power amplifies this signal in a wholly mechanical manner through mechanical power derived directly from the engine, machine or prime mover and produces a powerful output signal of isochronous, derivative stabilized form. This output may be used for direct control of speed changing instrumentalities without servo-boost, which involve additional lags and complication.

While we have described several embodiments of the invention, it is to be understood that the invention may be applied in other forms and environments. Changes may be made in the arrangements shown without departing from the spirit of the invention. Reference should be had to the appended claims for definition of the limits of the invention.

We claim:

1. An isochronous governor for a prime mover system having a rotary input shaft, comprising two infinitely variable speed changers each characteristically responsive in a different manner to variations in speed of the input shaft including planetary elements driven by said input shaft in a path of revolution about a central axis, each speed changer including an output member rotatable in accordance with the ratio setting of respective changers, a differential summing device having input components driven by respective changer output members and an output component connected to modify prime mover speed, a speed senser driven by said prime mover having an element movable in accordance with prime mover speed, translatable means interconnecting the planetary elements and actuable by the speed element for simultaneously adjusting the ratio of the speed changers in accordance with sensed prime mover speed, and a connection from the output of said first speed changer to stroke said second speed changer in accordance with the output of said first speed changer.

2. A governor according to claim 1 wherein said differential comprises three relatively movable races, balls therebetween and bearing on each, and a ball retainer, one of said races comprising a reaction member, two thereof comprising input members and said retainer comprising a driven member.

3. A governor according to claim 1 wherein said speed senser comprises a fixed race and an axially translatable concave cone, balls between said race and cone, means to rotate said balls in an orbit, said translatable cone being connected to said first speed changer to shift the ratio thereof in response to cone axial movement.

4. A governor according to claim 1 wherein said second speed changer is shifted as to ratio according to finite output from said first speed changer, and is further shifted in ratio according to the movement of the output element thereof.

5. A governor according to claim 1 including in said speed senser an adjuster to set the datum speed level of said system.

6. A governor according to claim 5 including a speed control shaft driven by said differential output means, and a selectively operable driving connection from said control shaft to said powerplant speed controller and to the adjuster for said speed senser.

7. A governor according to claim 5 including an alternative selective drive connection from said differential output member to said speed controller and to said adjuster for said speed senser.

8. A governor according to claim 5 wherein said speed changers, summing differential and speed senser comprise ball and race assemblies.

9. A governor according to claim 8 including an elastically restrained reaction race in one of said speed changers, an element movable in accordance with the reaction torque thereon, and means actuated by said latter element to modify the datum speed setting of said speed senser in accordance with said reaction torque.

10. A speed controlling mechanism having a power input member driven by a machine whose speed is to be controlled, an element movable in accordance with the instant speed error between said input member and a desired speed, a variable ratio transmission driven by said input member including a ratio controller actuated by said speed error element, said transmission having a power output element positioned according to the integral of the instant speed error, a second variable ratio transmission driven by said input member including a ratio controller actuated by and according to the position of the output element of said first transmission, said second transmission having a power output element, means to sum the positions of said two transmission output elements, and a speed controller for said machine operated by said summing means.

11. A speed controlling mechanism having a power input member driven by a machine whose speed is to be controlled, an element movable in accordance with the instant speed error between said input member and a desired speed, a variable ratio transmission driven by said input member including a ratio controller actuated by said speed error element, said transmission having a power output element positioned according to the integral of the instant speed error, a second variable ratio transmission driven by said input member including a ratio controller actuated in part by said speed error element and having an output element positioned according to instant speed error, means to sum the positions of said two transmission output elements, and a speed controller for said machine operated by said summing means.

12. A speed controlling mechanism having a power input member driven by a machine whose speed is to be controlled, an element movable in accordance with the instant speed error between said input member and a desired speed, two variable ratio transmissions driven by said input member, means actuated by said instant speed error element to control the operating ratio of said transmissions, one said transmission having an output element positioned according to power amplified instant speed error, the other said transmission having an output element positioned according to power-amplified cumulative speed error, means to sum the positions of said two transmission output elements, and a speed changer for said machine actuated by said summing means.

13. A speed controlling mechanism having a power input member driven by a machine whose speed is to be controlled, an element movable in accordance with the instant speed error between said input member and a desired speed, a variable ratio transmission driven by said input member, means actuated by said instant speed error element to control the operating ratio of said transmission, said transmission having a power-amplified output element positioned according to integrated speed error, a second variable ratio transmission driven by said input member, a controller for the operating ratio of said second transmission, an output element on said second transmission, means operated by said instant speed error element, by said first transmission output element and by said second transmission output element connected to operate said controller, means to sum the positions of said two transmission output elements, and means operated by said summing means to change the speed of said machine.

14. A speed controlling mechanism having a power input member driven by a machine whose speed is to be controlled, an element movable in accordance with the instant speed error between said input member and a desired speed, a variable ratio transmission driven by said input member, means actuated by said instant speed error element to control the operating ratio of said transmission, said transmission having a power-amplified output element positioned according to integrated speed error, a second variable ratio transmission driven by said input member, a controller for the operating ratio of said second transmission, an output element on said second transmission, differential means connected to the controller for the operating ratio of said second transmission comprising three input devices and one output device, one each of said input devices being connected for operation by said first transmission output element, by said second transmission output element and by said speed error element, means to sum the positions of said two transmission output elements, and means operated by said summing means to change the speed of said machine.

15. A speed controlling mechanism for a machine having a speed controller, comprising a sensitive element movable in accordance with the instant speed error between said machine and a desired speed, a power driven mechanical integrating force amplifier including an adjusting element adjusted by said sensitive element, said amplifier having a divided output, a power driven mechanical differentiator including an adjusting element adjusted by part of the output of said force amplifier, said differentiator having an output, a summing device actuated by the other part of the output of said force amplifier and by the output of said differentiator and an operating connection from said summing device to said speed controller.

16. A motion controlling mechanism for a machine having a motion controller comprising a sensitive element movable according to the instant error between actual machine motion and a desired motion, a power driven mechanical integrating force amplifier including an adjuster operated by said sensitive element, a power driven mechanically differentiator including an adjuster operated in part by the output of said amplifier, a summing device actuated by the outputs of said amplifier and differentiator, and an operating connection from said summing device to said motion controller.

References Cited in the file of this patent

UNITED STATES PATENTS

| | | |
|---|---|---|
| 198,978 | Grimm | Jan. 8, 1878 |
| 922,689 | Fox | May 25, 1909 |
| 1,968,656 | Schmidt | July 31, 1934 |
| 2,295,147 | Weydell | Sept. 8, 1942 |
| 2,369,426 | Benjamin | Feb. 13, 1945 |
| 2,553,736 | Adler | May 22, 1951 |
| 2,560,914 | Almeras | July 17, 1951 |
| 2,604,756 | Greenland | July 29, 1952 |
| 2,613,751 | Donovan et al. | Oct. 14, 1952 |
| 2,640,551 | Plumb | June 2, 1953 |
| 2,664,958 | Dancik | Jan. 5, 1954 |
| 2,667,344 | Robbins | Jan. 26, 1954 |
| 2,667,345 | Dale | Jan. 26, 1954 |
| 2,669,229 | Bimberg | Feb. 16, 1954 |
| 2,720,927 | Mergen et al. | Oct. 18, 1955 |
| 2,745,384 | Adler | May 15, 1956 |
| 2,771,286 | Clark | Nov. 20, 1956 |